FOSTER & MARSH.
Attaching Hubs to Axles.
No. 8,331. Patented Sept. 2, 1851.
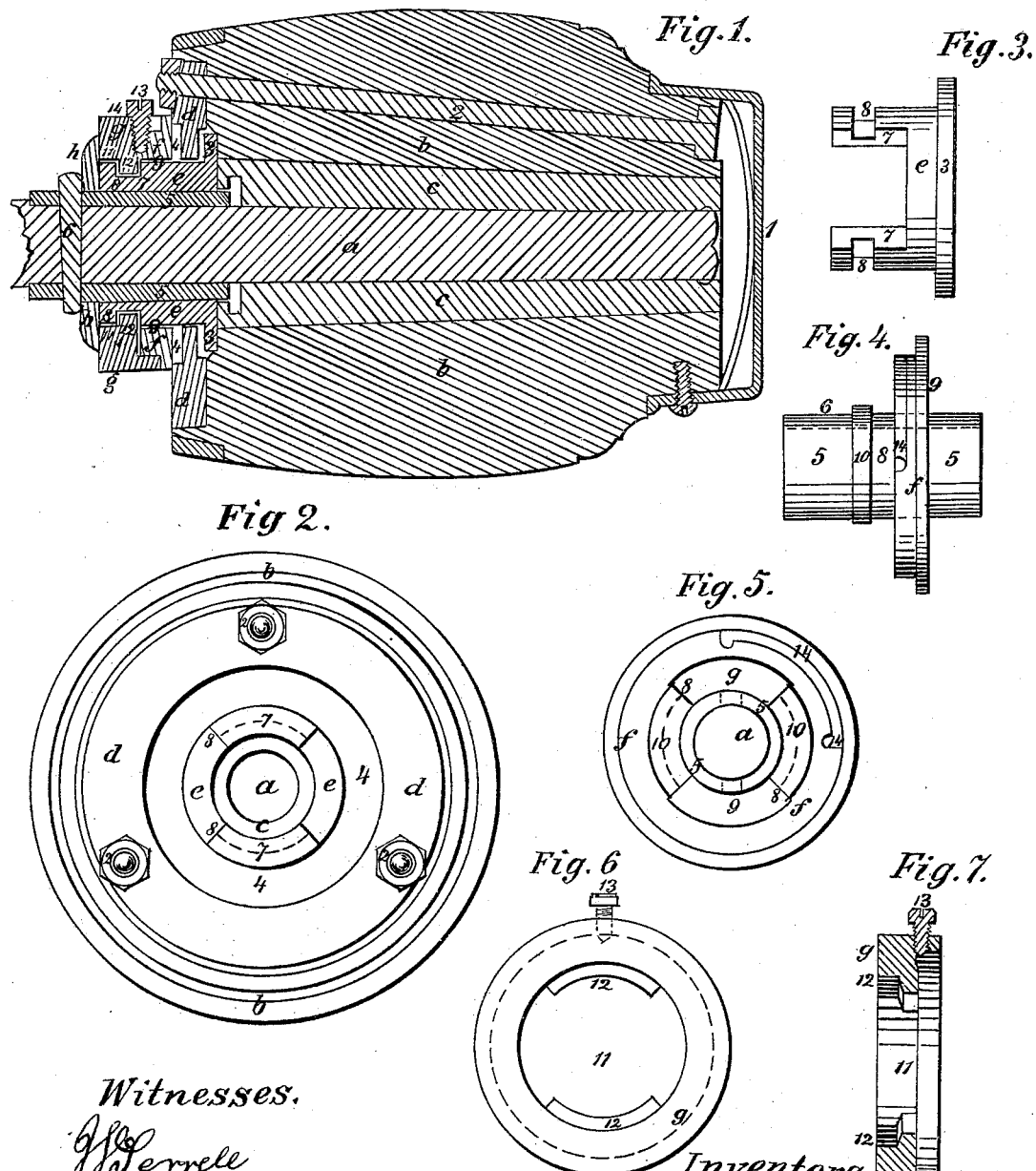

UNITED STATES PATENT OFFICE.

JUNIUS FOSTER, OF GREEN POINT, NEW YORK, AND DAVID MARSH, OF BRIDGEPORT, CONNECTICUT, ASSIGNORS TO FOSTER AND MARSH.

METHOD OF SECURING WHEELS TO AXLES.

Specification of Letters Patent No. 8,331, dated September 2, 1851.

*To all whom it may concern:*

Be it known that we, JUNIUS FOSTER, of Green Point, Kings county, State of New York, and DAVID MARSH, of Bridgeport, Fairfield county, State of Connecticut, machinists, have invented, made, and applied to use certain new and useful Improvements in Means of Connecting Hubs of Wheels to Their Axles; and we do hereby declare that the following is a full, clear, and exact description thereof, reference being had to the annexed drawing, making part of this specification, wherein—

Figure 1, is a vertical section lengthwise of the axle and hub; Fig. 2, is an end elevation of the hub removed from the axle; Fig. 3, is a side elevation of the coupling on the hub. Fig. 4, is a side elevation, and Fig. 5, is a back elevation of coupling on axle; Fig. 6, is a back view and Fig. 7, a section of the coupling ring to attach the hub to the axle.

The like marks of reference denote the same parts in each figure, as follows.

$a$, is the ordinary parallel or conical axle, receiving on it the cylinder $c$, of the hub $b$, which has a cap 1, secured on to keep the journal clean and is to be used as a receptacle for any lubricating material.

2, 2, are bolts passing through the hub with a head on one end, and a nut on the other, securing a circular plate $d$, let into or set on the inner end of the hub. This plate $d$, has a circular opening through the center receiving a short cylinder $e$, with a flanch 3, on its inner end between the hubs and plate $d$, with a washer between it and the plate $d$. It will now be seen that the plate $d$, being properly secured on the hub, the rotation is on the washer against the flanch 3, and on the cylinder $e$. The next thing to be effected therefor is to secure the cylinder $e$, to the axle and at the same time allow the hub and cylinder $e$, to be removed easily for cleaning or oiling. To effect this object we attach a small cylinder 5, on to the axle by a pin 6, or similar means; this cylinder 5, has a flanch $f$, which when the hub and axle are connected sets against a washer 4, in a countersink in the plate $d$, the cylinder 5 at the same time entering within the cylinder $e$.

7, are quarter circle couplings on the cylinder $e$, entering similar openings 9, through the flanch $f$, and 10, are similar quarter couplings on the cylinder 5, against the side of the flanch $f$.

8 is a groove, passing around both the quarter couplings 7 and 10 on the flanch $f$, and cylinder $e$, so that when the parts are placed together a complete groove is formed around the parts against the side of the flanch $f$, as seen in Figs. 3, and 4.

$g$, is a coupling box formed as a short cylinder and flanch see Fig. 7, and an opening 11, with two circular keys 12, each occupying a little less than the quarter of the circle; the flanch of this box $g$, goes over a portion of the flanch $f$, and has a screw 13, taking a groove 14, one quarter around the flanch $f$, with holes in the ends to receive the point of the screw 13, so that the box $g$, can be given a quarter rotation by partially unscrewing the screw 13, and secured by screwing the same down into place. The parts attached to the axle are to be put into place by placing the coupling box $g$, over the couplings 10, onto the flanch $f$, the keys 12, passing into place between the couplings 10, and into the line of the grooves 8, a washer $h$, is now placed behind the coupling $g$, to keep the parts in place and the pin 6, finally secures all to the axle.

The operation is as follows, the box $g$, is to be so turned that the keys 12, occupy their position in the groove 8, of the portion 10, of the coupling the hub is now to be placed on the axle the quarter couplings 7, entering the holes 9, and the grooves 8, matching each other all around the box $g$, is to be given a quarter rotation which brings the keys 12, into the grooves 8, of the quarter couplings 7, thereby retaining the cylinder $e$, in place and attaching the hub through the flanch 3, at which point the rotation of the hub is allowed of the plate $d$ rotating between the flanches 3, and $f$, without tending to uncouple the parts. The screws 13, now being screwed down enters the hole at the end of the groove 14, and prevents the coupling box $g$, from turning, thereby making a permanent attachment, and when the hub is to be removed the screw 13, is to be loosened the coupling box $g$, given a quarter rotation which disengages the keys 12, from the quarter couplings 7, allowing the hub to be removed.

It will be evident that the coupling box might be made in two pieces or divided into three or more parts producing the same result, but we believe that the formation with two parts, each the quarter of the whole circumference is the best, therefore we prefer and use the same.

We do not claim the securing of a hub to an axle by means of a groove around the inner end of the hub, or a bead on the axle, but What we do claim as new and of our own invention and desire to secure by Letters Patent of the United States is—

The application of the cylinder 5, and flanch $f$, on the axle in combination with the cylinder $e$, flanch 3, couplings 7, keys 12, and coupling box $g$, to retain the plate $d$, of the hub and allow its rotation between the flanches 3, and $f$, without any tendency to uncouple the hub from the axle substantially as described and shown.

In witness whereof we have hereunto set our signatures this sixteenth day of June one thousand eight hundred and fifty one.

JUNIUS FOSTER.
DAVID MARSH.

Witnesses:
W. TERRELL,
LEMUEL W. TERRELL.